Jan. 21, 1969 E. G. BABER 3,422,796
GROOVED COATING APPARATUS
Filed Jan. 24, 1967 Sheet 1 of 2
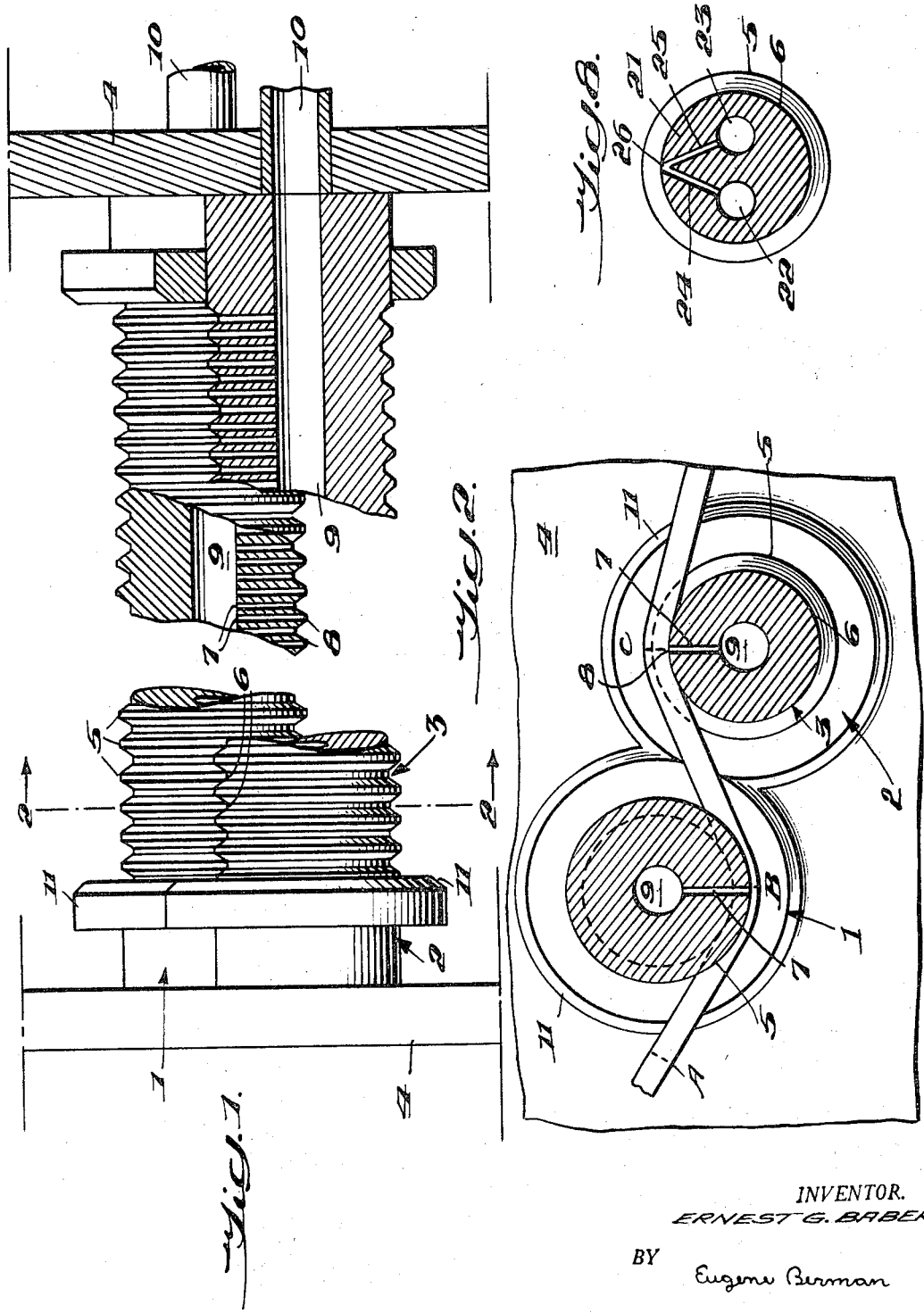
INVENTOR.
ERNEST G. BABER,
BY Eugene Berman
AGENT

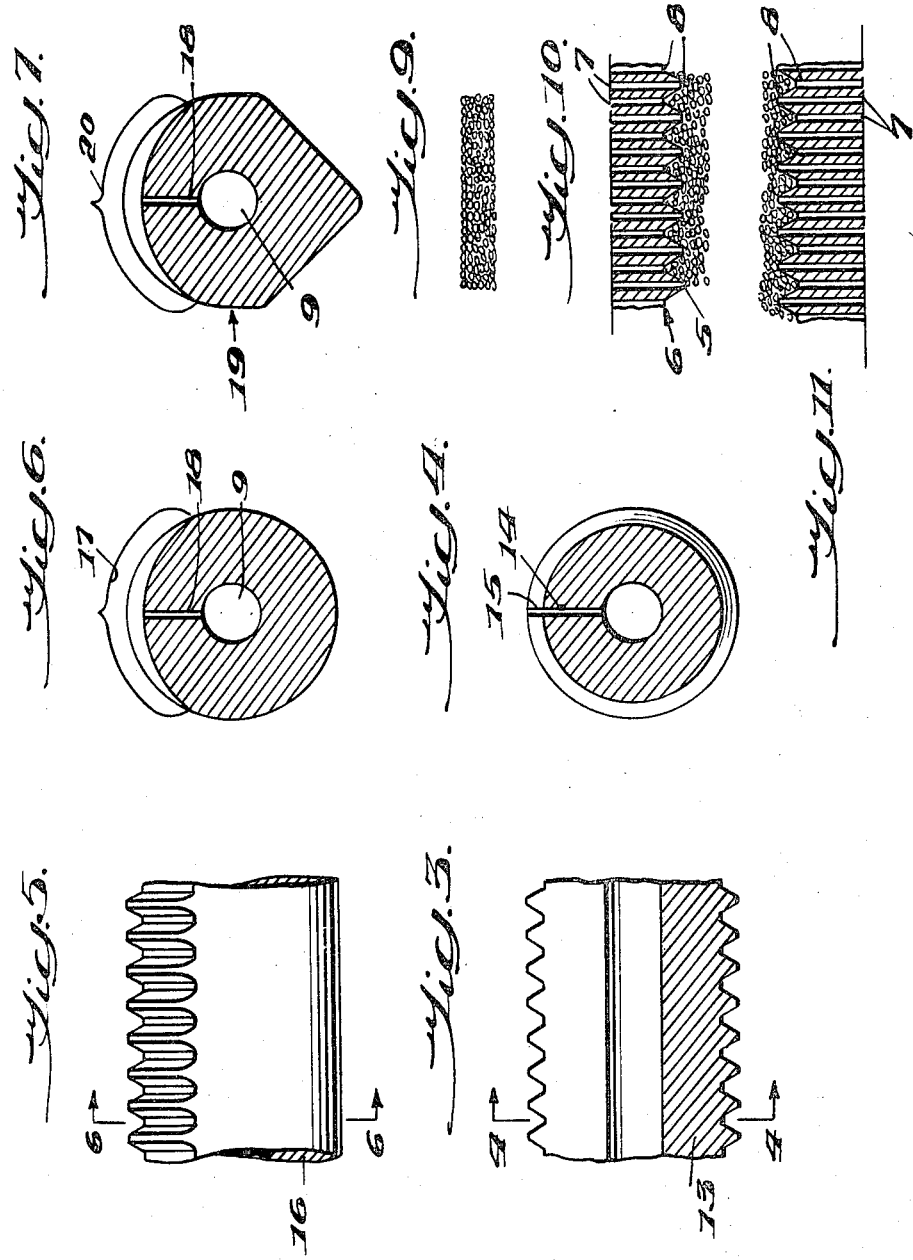

United States Patent Office

3,422,796
Patented Jan. 21, 1969

3,422,796
GROOVED COATING APPARATUS
Ernest G. Baber, Waynesboro, Va., assignor to E. I. du Pont de Nemours and Company, Wilmington, Del., a corporation of Delaware
Filed Jan. 24, 1967, Ser. No. 611,351
U.S. Cl. 118—411      14 Claims
Int. Cl. B05c 3/02

ABSTRACT OF THE DISCLOSURE

A fiber sheet coating apparatus having a pair of grooved cylinders with at least one internal conduit within each cylinder. Outlet means connect these conduits with the crests and roots of the grooves of the cylinders. The cylinders are positioned on opposite sides of the sheet of fibers so that the sheet is caused to follow an arc of contact with the grooves of each cylinder.

SPECIFICATION

This invention relates to an apparatus for applying a coating composition to a continuously moving sheet of fibers, especially a tow of continuous filaments, at a predetermined rate. More particularly, it relates to such an apparatus adapted to apply the coating composition to the sheet of fibers in a highly uniform manner, so that all of the fibers are evenly coated.

PRIOR ART

In the application of liquid finishes and other liquid coating compositions to fibers, it is a common procedure to pass the sheet of fibers through a bath of the composition. In this procedure such factors as the concentration of the treating agent, temperature, use of squeeze rolls or the like, and speed of the fiber sheet can be adjusted in an effort to control the rate of application of the composition to the fibers, but considerable adjustment of conditions is usually required before the desired rate of application is approached. Although the uniformity of application at any particular time is usually good, it is difficult to maintain a constant rate of application of the coating composition on the fiber over a period of time owing to changes in the cencentration of the bath and other factors influencing the rate at which the coating composition is picked up on the fiber.

The application of a liquid coating composition to a sheet of fibers at a fixed rate over a period of time has been attempted by metering the composition at a constant rate onto a smooth flat or circular plate over which the fiber sheet is passed, wiping the composition continuously from the plate. However, although the application may be set to be carried out at a constant rate on a gross basis, inspection of individual fibers reveals that the uniformity of application on a fiber-to-fiber basis is quite poor.

STATEMENT OF THE INVENTION

In accordance with the present invention, an apparatus applying a coating composition to a sheet of fibers, preferably continuous filament tow, is provided. The apparatus comprises a pair of cylinders, each having grooves on at least a portion of their outer surfaces. The cylinders are positioned on opposite sides of the sheet of fiber in a manner such that one side of the sheet follows an arc of contact with the grooved portions of one of the cylinders and the other side of the sheet follows an arc of contact with the grooved portion of the other cylinder. Each of the cylinders has therein at least one internal conduit to contain the coating composition. An outlet means within each of the cylinders connects the internal conduit with the crests and roots of the grooves of the grooved portions of the cylinders which contact the sheet of fiber.

PREFERRED EMBODIMENTS

In a preferred embodiment the outlet means is a plurality of channels terminating in orifices at the crest and root of the grooves. The outlet means in a second preferred embodiment is a longitudinal slot orifice.

In other preferred embodiments, various additional features are present in the apparatus. It is preferred that the cylinders are right circular cylinders spatially positioned with their axes parallel to one another and having collars at each end of each cylinder. The grooves of the cylinders are preferably aligned so that the crests of the grooves of one cylinder are in line with the roots of the grooves of the other cylinder. The cylinders are preferably spaced 2.5 to 4 cylinder radii from each other (measuring center to center). The grooved portions preferably have from 4 to 16 grooves per inch having a groove depth of from 1/32 to 1/4 inch. When the outlet means is a plurality of channels, the orifices of the channels are preferably positioned along a straight line parallel to the cylinder's axis. As will be seen hereinafter, the cylinder may have two or more internal conduits associated with separate outlet means.

The apparatus preferably further comprises a feed means, such as a positive displacement pump, to supply the coating composition to the conduit at a predetermined uniform rate, the feed means being connected to a control means which stops it when a signal from a sensing means indicates the sheet has stopped moving.

DRAWINGS

The details of the apparatus of the invention will be more clearly apparent by reference to the following detailed description when taken in connection with the accompanying drawings in which:

FIGURE 1 is a broken front elevation view of the apparatus of the invention, seen from the end from which the sheet of fibers leaves the apparatus, with the right-hand portion of the nearer cylinder and a central portion of the more distant cylinder seen in cross-section;

FIGURE 2 is a cross-sectional view 2—2 of the apparatus of FIGURE 1 showing details of its construction and a sheet of fibers being passed through the apparatus;

FIGURE 3 is a broken front elevation view of a modification of the cylinder shown in FIGURES 1 and 2, wherein the cylinder has a longitudinal slot orifice;

FIGURE 4 is a cross-sectional view 4—4 of the cylinder shown in FIGURE 3;

FIGURE 5 is a front elevation view of a cylinder having grooves on a limited portion of the cylinder surface;

FIGURE 6 is a cross-sectional view 6—6 of the cylinder shown in FIGURE 5;

FIGURE 7 is a cross-sectional view of a cylinder having a different cross-section;

FIGURE 8 is a cross-sectional view of a modified version of a grooved cylinder adapted for supplying two different coating compositions which come into contact with one another only at the last moment as they are being applied to the sheet of fibers; and FIGURES 9, 10, and 11 illustrate the sheet of fibers (A) before contacting either grooved cylinder, (B) while in contact with the first grooved cylinder, and (C) while in contact with the second grooved cylinder, respectively; illustrating how the apparatus supplies liquid coating composition to the central portions of the sheet as well as to the upper and lower surfaces of the sheet.

Considering each of the figures more specifically; in FIGURE 1 cylinders 1 and 2 having grooves 3 are mounted in fixed position on members 4 with the axes of the cylinders parallel and with the crests 5 of the grooves in one cylinder in alignment with the roots 6 of the grooves in the other cylinder. Channels 7 are drilled into each grooved cylinder from the crests and roots of each of the grooves, with the orifices 8 of the channels forming a straight line along the bottom of cylinder 1 and a straight line along the top of cylinder 2. The channels 7 connect with supply conduits 9 within each grooved cylinder, which in turn are connected to pipes 10 connecting to a controlled delivery means (not shown), preferably a positive displacement pump. Collars 11 at the end of the grooved section of each cylinder are provided to prevent the sheet of fibers (not shown) from being passed in contact with the cylinders from spreading beyond the grooved sections of the cylinders.

FIGURE 2 is a side view of FIGURE 1 in cross-section along the lines 2—2, with the sheet of fibers being shown passing under grooved cylinder 1 and over grooved cylinder 2. The liquid being applied to the fibers is delivered to supply conduits 9 at a predetermined rate and flows through channels 7 to orifices 8. In FIGURE 2 the orifice shown for grooved cylinder 1 is at the crest of a groove and the orifice shown for grooved cylinder 2 is at the root of a groove.

FIGURES 3 and 4 illustrate a suitable cylinder 13 having another type of outlet means. The cylinder is similar to the cylinder previously described except that a longitudinal slot 14 is used instead of the channels 7. The slot 14 terminates in a longitudinal orifice 15 on the grooved surface of the cylinder.

FIGURES 5 and 6 illustrate a cylinder 16 wherein the grooves do not extend around the entire periphery but rather are confined to portion 17 contacted by the fiber sheet. Outlet means 18 may be channels 7 or a longitudinal slot orifice 14.

FIGURE 7 illustrates another suitable cylinder 19. As will be seen hereinafter, "cylinder" is broadly defined and includes a variety of cross-sections other than circular, which can be employed. The surface of the cylinder defines a convex arc 20 in the grooved portion of the cylinder.

FIGURE 8 is a cross-sectional view showing another grooved cylinder 21 having two internal supply conduits, 22 and 23. Channel 24 leading from conduit 22 and channel 25 leading from conduit 23 intersect in a single orifice 26. This cylinder design is extremely useful for coating fibers with two different compositions which react with one another or form systems of quite poor stability, one composition being pumped through conduit 22 and the other through conduit 23. Of course, two of the grooved cylinders are used, with one cylinder positioned with its orifices facing downwards and the other cylinder positioned with its orifices facing upwards.

In FIGURE 9 the cross-sectional confiuguration of the sheet of fibers is depicted at point A (in FIGURE 2), before the sheet contacts either of the grooved cylinders. FIGURE 10 depicts the cross-sectional configuration of the sheet of fibers at point B, just as it passes under the orifices of grooved cylinder 1, illustrating how the grooved cylinder momentarily deforms the sheet of fibers and applies the coating composition both to the fibers at the upper surface of the sheet and to fibers in the central portion of the sheet. FIGURE 11 depicts the cross-sectional configuration of the sheet of fibers at point C an instant later, illustrating how grooved cylinder 2 momentarily deforms the fibers sheet in the opposite sense and applies the coating composition both to the fibers at the lower surface of the sheet and to fibers in the central portion of the sheet. The points of application of coating composition to the central portion of the fiber sheet by grooved cylinder 2 are therefore intermediate between the points of application of coating compositions to the central portion of the fiber sheet by grooved cylinder 1. After leaving grooved cylinder 2, the sheet of fibers reassumes the configuration shown in FIGURE 9.

The term "cylinder" is used herein to define in its broad sense a surface traced by a straight line parallel to another straight line (in particular, the axis of the cylinder). As previously stated, the cylinders are preferably right circular cylinders having parallel axes; however, cylinders of other cross-sections may be employed as long as the grooved portion of the cylindrical surface to be in contact with the moving sheet of fibers is essentially a convex arc in cross-section. The convex arc may contain one or more straight sections. An example of a suitable cylindrical shape (other than a right circular cylinder) is shown in FIGURE 7.

The cylinders should be spatially positioned on opposite sides of the sheet of fibers so that the sheet is caused to follow an "arc of contact" with each of the cylinders. The sheet of fibers is passed onto one grooved cylinder and passed away from the other grooved cylinder at such an angle that it follows an arc of contact on each grooved cylinder, the line of channel orifice on each being located along the arc of contact and preferably at the bottom of one grooved cylinder and the top of the other grooved cylinder. Usually the sheet of fibers is passed under the first grooved cylinder and over the second grooved cylinder, although this may be reversed. By following an arc of contact, the deformation of the fiber sheet as shown in FIGURES 10 and 11 is assured and a highly uniform distribution of coating composition is realized.

Factors such as the depth of the grooves, the tension on the sheet, the thickness of the sheet will affect the minimum arc required. Suitable spatial positioning which give adequate arcs of contact will be easily determined by one skilled in the art.

The cylinders are spaced relatively close together. Usually the spacing is similar to that shown in FIGURE 2 in which the distance between the centers of the cylinders is on the order of 2.5 to 4 cylinder radii.

Cylinders having between about 4 and about 16 grooves per inch (in the grooved portion) are preferred. Higher and lower values are also suitable. The upper limit depends on such factors as the size of the orifice relative to the groove width and the area of surface contact required. The lower limit depends on such factors as the number of grooves needed to give adequate penetration to the fiber sheet.

A groove depth in the range about $\frac{1}{32}$ and about $\frac{1}{4}$ inch (measured from root to crest) is preferred. Higher and lower values are also suitable. The depth must be sufficient to allow substantial contact with the interior portions of the sheet of fibers, yet should not fully penetrate (have the crests pass completely through) the sheet. It is seen that the optimum groove depth depends upon how firmly the sheet is caused to contact the roller (e.g., the arc of contact and the sheet tension). As is shown in the following examples, cylinders having approximately 8 grooves per inch having a depth of 0.06 and 0.072 inch give suitable results.

For convenience in manufacture, the grooves usually extend around the entire cylinder but it is not necessary that they extend beyond the arc of contact of the moving sheet of fiber. The grooves need not extend along the entire length of the cylinder (i.e., they must only extend along the portion of circumference which constitutes the arc of contact). Although the groove may be a continuous thread on the surface of the cylinder, for the purposes of this invention, the thread is not considered as a single groove, but a series of separate grooves along that portion of the pipe contacted by the sheet.

The outlet means provides the connection between the internal conduit and the portion of the cylinder's grooved surface contacted by the sheet. A plurality of channels terminating as orifices at the crest and root of the grooves is preferred. A longitudinal slot orifice is also preferred.

The orifices of the outlet means should be provided at the portions of the cylinder contacted by the sheet and be designed to uniformly supply coating composition at those points. The dimensions of the orifices are dependent upon such factors as the desired stream velocity and the desired volume of flow.

The coating composition is delivered at a constant predetermined rate by a means such as a positive displacement pump. The pump is preferably actuated by the same signal which actuates the means for forwarding the sheet of fibers into and away from the apparatus, so that no coating composition is delivered when the sheet of fibers is not moving.

EXAMPLES OF THE INVENTION

The following examples, although not intended to be limitative, illustrate applicators in accordance with the preesnt invention in operation.

*Example 1*

Right circular cylinders comprising the central portions, 4.75 inches (12.1 cm.) in length, of each of two sections of 6-inch (15.2 cm.) stainless steel pipe having an internal diameter of 1.046 inch (2.66 cm.) and an external diameter of 1.312 inch (3.33 cm.) are threaded with Acme threads, 8 to the inch, and 0.072 inch (1.83 mm.) deep. A series of holes, each $\frac{1}{32}$ inch (0.79 mm.) in diameter, is drilled to the bore of the pipe in a straight line along the length of each of the pipes at the crest and root of each of the threads. The pipes are mounted on a jig in fixed position, with their axes parallel to one another and with the center of the second pipe spaced 1.75 inch (4.44 cm.) horizontally away from and 0.81 inch (2.06 cm.) vertically above the center of the first pipe; and with the crest of the thread on the second pipe directly opposite the root of the first pipe. One end of each pipe is capped and the other end of each pipe is attached to the delivery system of a pump.

An aqueous coating composition containing 3 wt. percent of a terpolymer of 88 wt. percent nonylphenoxypolyethylene glycol acrylate in which the polyethylene glycol segment contains about 37 ethylene oxide units, 10 wt. percent glycidyl methacrylate, and 2 wt. percent acrylic acid, is prepared by the general method described in Example 3 of Belgian Patent 656,821. A tow made up of approximately 100,000 filaments composed of acrylonitrile polymer and having a denier of 4.5 per filament is passed at the rate of 100 yards per minute (91.4 meters per minute) under the first pipe and over the second pipe in the above apparatus while the coating composition is delivered from the pump at the rate of 1200 cc. per minute (600 cc. per minute to each of the two pipes). The spatial relation of the pipes causes the tow to follow a convex arc of contact with each of the pipes. The tow is dried in an over at a maximum temperature of 145° C. with a residence time of 13 minutes. Inspection of individual filaments in the tow reveals excellent uniformity of application of the coating composition.

*Example 2*

Apparatus as shown in FIGURES 1 and 2 is made up, using right circular cylinders of stainless steel. Each cylinder has an outside diameter of 1.25 inch (3.18 cm.) and a grooved section length of 3.44 inch (8.74 cm.) between the collars, containing grooves 0.06 inch (1.52 mm.) deep. In one cylinder the grooved section has 30 roots and 29 crests and in the other cylinder the grooved section has 29 roots and 30 crests. A series of holes, each $\frac{1}{32}$ inch (0.79 mm.) in diameter is drilled to the 0.250 inch (0.635 cm.) diameter internal conduit from the crests and roots of each groove, the holes lying along a straight line parallel to the axis of the cylinder in each case. The cylinders are mounted in fixed position parallel to one another with 0.49 inch (1.27 cm.) horizontal clearance between them (1.74 inch horizontal distance between centers) and with the top of the second cylinder 0.5 inch (1.27 cm.) above the bottom of the first cylinder. As shown in the figure, the crests of the grooves in the first cylinder are directly opposite the roots of the groves in the second cylinder. One end of each cylinder is capped and the other end of each pipe is attached to the delivery system of a pump.

Using this apparatus, an aqueous coating composition is applied to a tow of acryonitrile polymer filaments as in Example 1. Inspection of individual filaments in the tow reveals excellent uniformity of application of the coating composition.

UTILITY

It has been found that the apparatus of the invention gives excellent distribution of the coating composition being applied throughout the sheet of fibers being treated. The deformations induced in the fiber sheet by the two grooved cylinders assists in the transfer of the composition throughout the sheet so that the fibers are coated with a high degree of uniformity.

One advantage of the apparatus of the invention is that the composition being applied to the sheet of fibers does not contact the air until it is actually coated on the fibers. Changes in the composition of the liquid resulting from evaporation or any setting action caused by the air is therefore precluded. When the liquid is an emulsion or other metastable coating composition, undesirable phase separation or other changes in the composition between its preparation and its application are minimized by the short interval between the pumping of the composition and its application to the sheet of fibers, as contrasted with the longer intervals of time normally required for stability of the liquid system in application systems employing a bath. The amount of coating composition in transit can be minimized by keeping the distance from the pump to the supply conduit short and minimizing the diameter of the supply conduit.

Since many different embodiments of the invention may be made without departing from the spirit and scope thereof, it is to be understood that the invention is not to be limited by the specific illustrations except to the extent defined in the following claims.

What is claimed is:

1. An apparatus for applying a coating composition to a sheet of fibers comprising: a pair of cylinders each having grooves on at least a portion of the outer surface of said cylinders,
   said cylinders spacially positioned on opposite sides of said sheet to cause one side of said sheet to follow an arc of contact with the grooved portions of one of said cylinders and the other side of said sheet to follow an arc of contact with the grooved portion of the other of said cylinders,
   said cylinders each having at least one internal conduit therein, and
   said cylinders each having outlet means connecting said internal conduit with the crests and roots of said grooves of said grooved portions of said cylinders which contact said sheet.

2. The apparatus of claim 1 wherein the said grooved portion of each of said cylinders which contact the said sheet is a convex arc.

3. The apparatus of claim 1 wherein the said cylinders are right circular cylinders and are spatially positioned with their axes parallel to one another.

4. The apparatus of claim 3 wherein the crests of the grooves of one cylinder are in line with roots of the grooves of the other cylinder along lines drawn perpendicular to the axes of both cylinders.

5. The apparatus of claim 3 wherein said cylinders have equal radii and the distance between the centers of said cylinders is from about 2.5 to about 4 times the cylinder radii.

6. The apparatus of claim 1 wherein said portion of said outer surface of said cylinders have from about 4 to about 16 grooves per inch.

7. The apparatus of claim 6 wherein said grooves are from a depth measured from root to crest from about 1/32 to about 1/4 inch.

8. The apparatus of claim 1 wherein said grooved portions comprise the entire outer peripheral surface of each said cylinder.

9. The apparatus of claim 1 wherein said outlet means comprises a plurality of channels terminating in orifices at the crest and root of said grooves.

10. The apparatus of claim 9 wherein said orifices are positioned along a straight line parallel to the axis of said cylinder.

11. The apparatus of claim 1 wherein said outlet means is a longitudinal slot orifice.

12. The apparatus of claim 1 having at least two internal conduits, said outlet means separately connecting each of said conduits with the surface of said grooved portions of said cylinder which contact the said sheet.

13. The apparatus of claim 12 wherein said separately connecting outlet means join to form at least one single orifice at the said surface of said grooved portions of said cylinder which contact the said sheet.

14. The apparatus of claim 1 further comprising collars at each end of said cylinder to maintain the said sheet at constant width and to prevent shifting of said sheet.

References Cited

UNITED STATES PATENTS

| | | | |
|---|---|---|---|
| 3,120,027 | 2/1964 | Baggett et al. | 264—134 |
| 3,157,536 | 11/1964 | Caines | 118—225 |

FOREIGN PATENTS

| | | |
|---|---|---|
| 103,810 | 2/1963 | Netherlands. |

WALTER A. SCHEEL, *Primary Examiner.*

J. P. McINTOSH, *Assistant Examiner.*

U.S. Cl. X.R.

118—419